United States Patent [19]

Dando et al.

[11] Patent Number: 5,908,914

[45] Date of Patent: *Jun. 1, 1999

[54] BENZYLIC ETHER PHENOLIC RESOLE RESINS AND THEIR USES

[75] Inventors: Thomas Edward Dando, Sunbury; William Rexford Dunnavant, Columbus; Robert Bernard Fechter, Worthington; Heimo Josef Langer, Columbus, all of Ohio

[73] Assignee: Ashland Inc., Columbus, Ohio

[ * ] Notice: This patent is subject to a terminal disclaimer.

[21] Appl. No.: 08/684,800

[22] Filed: Jul. 17, 1996

[51] Int. Cl.$^6$ .............................. C08G 8/04; C08G 14/02
[52] U.S. Cl. ....................... 528/129; 523/143; 523/145; 524/372; 524/375; 525/504; 528/154; 528/243; 528/493; 528/495; 528/502 C; 528/503; 264/331.19
[58] Field of Search ................................. 523/143, 145; 525/504; 524/372, 375; 264/331.19; 528/129, 154, 243, 502 C, 503, 493, 495

[56] References Cited

U.S. PATENT DOCUMENTS

| Re. 34,228 | 4/1993 | Armbruster et al. | 528/129 |
|---|---|---|---|
| 1,653,302 | 12/1927 | Matheson | 528/137 |
| 3,429,848 | 2/1969 | Robins | 523/143 |
| 3,485,797 | 12/1969 | Robins | 526/71 |
| 3,676,392 | 7/1972 | Robins | 524/442 |
| 3,687,896 | 8/1972 | Vargiu et al. | 528/137 |
| 4,116,916 | 9/1978 | Holik | 524/378 |
| 4,157,324 | 6/1979 | Culbertson | 524/361 |
| 4,317,896 | 3/1982 | Holik | 525/501 |
| 4,546,124 | 10/1985 | Laitar et al. | 523/143 |
| 5,043,365 | 8/1991 | Gardziella et al. | 523/143 |
| 5,380,800 | 1/1995 | Bender et al. | 525/133.5 |

OTHER PUBLICATIONS

Hüttenes–Albertus—Innovation and Partnership Foundry Trade Journal, 167(3487), pp. 736–737, Dec. 10/24, 1993.
R. W. Martin in The Chemistry of Phenolic Resole Resins, John Wiley & Sons, 1956, p. 111.
A. Knop and L. A. Pilato in "Phenolic Resole Resins Chemistry, Applications and Performance," Springer–Verlag, 1985, pp. 93–95.
Ashland Internal Report entitled Characterization of Two–Part Foundry Binder System: Deltacure 124–156 (Part I) and Deltacure 23–15 (Part II) dated Sep. 15, 1995.
Ashland Internal Report entitled Characterization of Three Part No Bake Binder System: Delta Techniset 20–463(I), Techniset 23–414 (II) and Techniset 17–727 (III) dated Oct. 5, 1995.

*Primary Examiner*—Marion E. McCamish
*Assistant Examiner*—John J. Guarriello
*Attorney, Agent, or Firm*—David L. Hedden

[57] ABSTRACT

This invention relates to benzylic ether phenolic resole resins prepared in a sealed reaction vessel and their uses. The benzylic ether phenolic resole resins are prepared by heating phenol and an aldehyde in a sealed reaction vessel in the presence of a divalent metal catalyst without removing water generated by the reaction until an appropriate endpoint for the resin is reached. The benzylic ether phenolic resole resins produced by the process are preferably free or essentially free of unreacted formaldehyde and can be used in the resin component of phenolic-urethane foundry binders to make foundry cores and/or molds by the cold-box and no-bake processes. The cores and/or molds are used for making metal castings.

9 Claims, No Drawings

BENZYLIC ETHER PHENOLIC RESOLE RESINS AND THEIR USES

FIELD OF THE INVENTION

This invention relates to benzylic ether phenolic resole resins prepared in a sealed reaction vessel and their uses. The benzylic ether phenolic resole resins are prepared by heating phenol and an aldehyde in a sealed reaction vessel in the presence of a divalent metal catalyst without removing water generated by the reaction until an appropriate endpoint for the resin is reached. The benzylic ether phenolic resole resins produced by the process are preferably free or essentially free of unreacted formaldehyde and can be used in the resin component of phenolic-urethane foundry binders to make foundry cores and/or molds by the cold-box and no-bake processes. The cores and/or molds are used for making metal castings.

BACKGROUND OF THE INVENTION

Two major categories of phenolic resins are known. These are the novolak resins and the phenolic resole resins. Novolak resins are prepared by the reaction of excess phenol with formaldehyde under strongly acidic conditions where the formaldehyde to phenol ratio is typically from 0.5:1.0 to 1.0:1.0. Novolak resins are linear or slightly branched condensation products linked together by methylene bridges, and have relatively low molecular weight, i.e. up to approximately 2,000. They are soluble and permanently fusible, i.e. thermoplastic. Novolaks are cured with hexamethylenetetramine (HEXA). In foundry applications, novolak resins are almost exclusively used in the "shell process" where foundry sand is precoated with the resin before curing with HEXA.

On the other hand, phenolic resole resins are prepared by the reaction of phenol and excess formaldehyde under alkaline conditions. Formaldehyde to phenol ratios between 1.1:1.0 to 3.0:1.0 are customarily used. Phenolic resole resins are somewhat stable at room temperature, but are transformed into three dimensional, crosslinked, insoluble, and infusible polymers by the application of heat.

It is generally accepted that the best overall performance characteristics for phenolic-urethane foundry binders are achieved by using highly ortho substituted phenolic resole resins having benzylic ether and methylene bridging units between the constituent aromatic rings where the ratio of ether to methylene bridging units is at least 1.0, i.e. benzylic ether phenolic resole resins. These benzylic ether phenolic resole resins are produced by the reaction of phenol with formaldehyde in the presence of a divalent metal catalyst at atmospheric pressure with reflux such that the formaldehyde to phenol ratio in the reaction charge is generally from 1.0:1.0 to 2.0:1.0.

The preparation of benzylic ether phenolic resole resins involves the reaction of phenol and formaldehyde in the presence of a divalent metal catalyst in an open reaction vessel at increased temperature and the continuous stripping of water formed by the reaction from the reaction mixture. See U.S. Pat. Nos. 3,409,579; 3,485,797; and 4,546,124.

It is known to use pressure in the preparation of novolak resins. R. W. Martin in "The Chemistry of Phenolic resole resins," John Wiley & Sons, 1956, p. 111 mentions preparation of novolak resins without catalysts at high temperatures in autoclaves. A. Knop and L. A. Pilato in "Phenolic resole resins Chemistry, Applications and Performance," Springer-Verlag, 1985, pp. 93–95 mentions the continuous production of novolak resins which involves heating at 120° C.–180° C. at up to 100 psig to enhance the reaction rate. A process for preparing novolak resins under pressure is disclosed in U.S. Pat. No. 3,687,896, although it is not clear how the pressure in the reaction vessel is obtained. These novolak resins prepared under pressure are not highly ortho substituted and contain only methylene bridges between the aromatic rings.

SUMMARY OF INVENTION

This invention relates to benzylic ether phenolic resole resin prepared in a sealed reaction vessel and their uses. The process for preparing the benzylic ether phenolic resole resins comprises:

(a) charging phenol, an aldehyde, optionally an alcohol, and a catalytic amount of a divalent metal catalyst to a sealable reaction vessel capable of maintaining a pressure above atmospheric pressure, preferably equipped with a stirring means, heating means, cooling means, heat sensor, and pressure sensor, such that the mole ratio of formaldehyde to phenol in the reaction charge is from 1.0:1.0 to 1.5:1.0;

(b) sealing said reaction vessel;

(c) heating said sealed reaction vessel to a temperature sufficient to generate a pressure of at least 10 psig, typically from 10 psig to 50 psig, above atmospheric pressure within the sealed reaction vessel;

(d) continuing said reaction, without removing water formed by the reaction, until an appropriate endpoint is reached;

(e) venting the reactor to 0 psig while distilling excess water and other condensable vapors; and (f) applying a vacuum to distill the remaining condensable vapors.

The process takes place in a sealed reaction vessel which is heated sufficiently to generate an internal pressure in the reaction vessel. Since the reaction vessel remains sealed, the water formed by the reaction of the phenol and formaldehyde is not removed until the endpoint of the reaction is reached. The process has several advantages when compared to processes which use an open reaction vessel for making benzylic ether phenolic resole resins:

1. When resins of comparable weight average molecular weight are prepared, the process results in a higher yield or conversion of raw materials to benzylic ether phenolic resole resin per unit of time.
2. The process results in lower yields of unreacted starting materials such as formaldehyde, phenol, and alcohol.
3. The process results in shorter cycle times.
4. Benzylic ether phenolic resole resins of the same molecular weight can be made with lower formaldehyde to phenol ratios.
5. The product which remains after distillation of the water of reaction and the unreacted starting materials is essentially free of unreacted formaldehyde, i.e. less than 1% free formaldehyde, typically less than 0.25 weight %, preferably non detectable or 0% free formaldehyde.

6. The weight average molecular weight and viscosity of the mixture remaining after distillation is such that the mixture is particularly suitable for use in foundry binders.

The reaction product, before distillation, made with this process comprises (1) at least one component having a single ring phenolic structure; (2) at least one component having a multiple ring phenolic structure; (3) water; and (4) unreacted raw materials such as formaldehyde, phenol, and other organic products. Components (3) and (4) are removed from the mixture by distillation.

For purposes of this invention, the mixture of (1) and (2) will be referred to as "a benzylic ether phenolic resole resin". The "benzylic ether phenolic resole resin" is the mixture that remains after separation of the water and unreacted starting materials and comprises (1) at least one component having a single ring phenolic structure (represented by structure I which follows), and (2) at least one component having a multiple ring phenolic structure (represented by structure II which follows) which is used for making foundry binders. Structure II represents dimers, trimers, oligomers, and or polymers.

This mixture may also contain some minor amounts of water and unreacted starting materials such as phenol, formaldehyde, and alcohol. The mixture is typically formed such that the weight ratio of (,1) to (2) is typically from 0:100 to 67:100, more typically from 5:100 to 33:100, and is preferably essentially free of formaldehyde, i.e. less than 1% free formaldehyde, typically less than 0.25% free formaldehyde, preferably 0% free formaldehyde. The mixture has a weight average molecular weight ($M_W$) of about 700 to 2,000, preferably 900 to 1,400, and a viscosity of about 0.5 poise to about 5.0 poise 100° C., preferably 0.7 poise to about 2.0 poise at 100° C. when a formaldehyde to phenol molar ratio of about 1.0:1.0 to about 1.5.1:0, preferably about 1.0:1.0 to about 1.2:1.0 is used to prepare the resins. Furthermore, the "benzylic ether phenolic resole resin" comprising (1) at least one component having a single ring phenolic structure, and (2) at least one component having a multiple ring phenolic structure has a benzylic ether to methylene bridge ratio, as determined by C13 NMR spectroscopy of from 0.3:1.0 to 0.9:1.0, preferably 0.4:1.0 to 0.85; and (b) a total ortho to para substitution ratio of 3.0:1.0 to 10.0:1.0.

The benzylic ether phenolic resole resins, made in a sealed reaction vessel in the presence of pressure resulting from the reaction, are suitable for use in the resin component of a phenolic urethane foundry binder and can be used to make acceptable foundry cores and/or molds by the no-bake or cold-box process. This is surprising in view of the teachings in U.S. Pat. Nos. 3,409,579; 3,485,797; and 4,546,124 which indicate that it is highly preferred to use benzylic ether phenolic resole resins which have a benzylic ether to methylene bridge ratio greater than 1.0.

Furthermore, tests indicate that castings made with cores and/or molds from these resins made under pressure have less metal penetration. Metal penetration occurs when metal or metal oxides fill the voids between the sand grains of the core without displacing them or chemically changing the silica or binder. When there is penetration in a casting, the casting will require repair or be discarded as scrap. This increases cost and decreases efficiency in the foundry.

ENABLING DISCLOSURE AND BEST MODE

The benzylic ether phenolic resole resin is prepared by reacting an excess of aldehyde with a phenol in the presence of a divalent metal such as zinc, lead, manganese, copper, tin, magnesium, cobalt, calcium, or barium in a sealed reaction vessel heated to a temperature sufficient to generate pressures of 10 psig to 50 psig, most preferably from 20 psig to 40 psig, within the reaction vessel. The reaction vessel is typically equipped with a stirring means, heating means, cooling means, heat sensor, pressure sensor. The mole ratio of formaldehyde to phenol in the reaction charge is from 1.0:1.0 to 1.5:1.0, preferably from 1.0:1.0 to 1.2:1.0.

Typically, the temperature of the reactor needed to generate the appropriate pressures is from of 100° C. to 150° C., most preferably to 120° C. to 135° C. For safety reasons, the temperature is preferably increased incrementally in stages to avoid creating a highly exothermic reaction. Since the reaction vessel is sealed, the reaction will take place in the presence of water formed by the reaction of the formaldehyde and phenol. Heating and pressure are maintained while the reaction continues without removing water formed by the reaction.

After an appropriate endpoint is reached, any water of reaction is removed by distillation along with unreacted starting materials such as formaldehyde, phenol, and alcohol. Examples of appropriate endpoints include percent free formaldehyde and viscosity. Typical endpoints based on free formaldehyde vary from 0 to 0.2 using the sodium sulfite test.[1] When the appropriate endpoint is reached, the reactor is then vented to 0 psig while distilling excess water and other condensable vapors. A vacuum is applied to distill the remaining condensable vapors.

[1] To measure free formaldehyde by the sodium sulfite test, the resin mixture is dissolved in an organic solvent such as tetrahydrofuran and then aqueous sodium sulfite is added to form a solution. The solution is titrated with 0.1 N HCl and free formaldehyde is calculated.

The product of this process is an aqueous mixture comprising (1) at least one component having a single ring phenolic structure, and (2) at least one component having a multiple ring phenolic structure, (3) water, and (4) unreacted starting materials such as formaldehyde, phenol, and alcohol where the weight ratio of (1) and (2) to (3) and (4) is from 80:20 to 95:5, typically, from 82:18 to 90:10. The benzylic ether phenolic resole resin comprises (1) at least one component having a single ring phenolic structure, and (2) at least one component having a multiple ring phenolic structure, and is separated from the unreacted starting materials and water by distilling the water and unreacted starting materials, leaving the benzylic ether phenolic resole resin which is a mixture of (1) and (2). The resulting benzylic ether phenolic resole resin preferably contains less than 1.0% free formaldehyde, typically less than 0.25% free formaldehyde, preferably 0% free formaldehyde, and is characterized by a benzylic ether to methylene bridge ratio, as determined by C13 NMR spectroscopy, of from 0.3:1.0 to 0.9:1.0, preferably 0.4:1.0 to 0.75:1.0, and a total ortho to para substitution ratio of 3:1 to 10:1.

The benzylic ether phenolic resole resin comprises a mixture of components (I) and (II) represented by the following structural formulae:

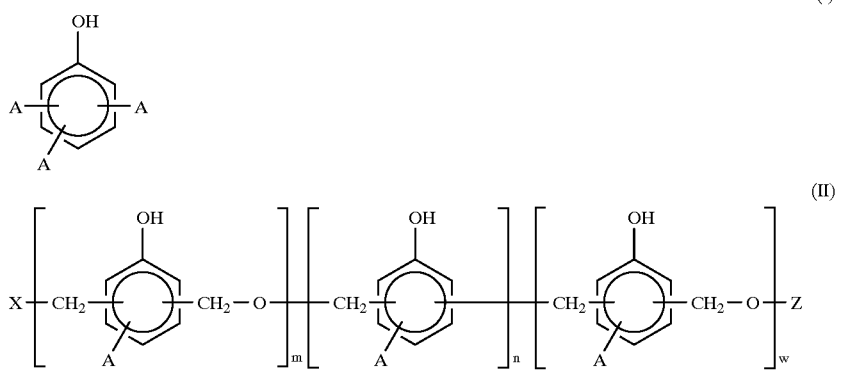

where

A = —H, —CH$_2$OH, —CH$_2$OR or a C$_1$ to C$_{20}$ hydrocarbon radical;

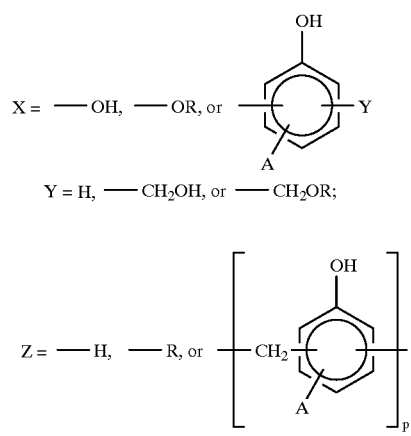

Y = H, —CH$_2$OH, or —CH$_2$OR;

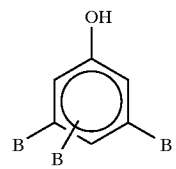

R = a C$_1$ to C$_{20}$ hydrocarbon radical;
m, n and p = 0,1 or greater than 1;
w = 1 or greater than 1;
the sum of w and p is at least 2, and
such that the benzylic ether to methylene bridge ratio for the mixture of (I) and (II), as determined by C13 NMR spectroscopy, is from 0.3:1.0 to 0.9:1.0, preferably 0.4:1.0 to 0.8:1.0.

In a preferred embodiment of the benzylic ether phenolic resole resin, the mixture of structures I and II is such that:

1. At least 75 percent by weight of the mixture is attributed to molecules represented by structure II.
2. The total ortho to para substitution ratio in structure II is from 3.0:1.0 to 10.0:1.0.
3. The weight average molecular weight of the mixture is from 900 to 1,400.
4. The mixture has essentially less than 0.25% free formaldehyde as determined by the sodium sulfite test.
5. The benzylic ether to methylene bridge ratio, as determined by NMR spectroscopy is preferably from 0.4:1.0 to 0.85:1.0 for modified benzylic ether phenolic resole resins, and preferably from 0.4:1.0 to 0.75:1.0 for unmodified benzylic ether phenolic resole resins.
6. The viscosity is from 0.7 poise to about 2.0 poise at 100° C.
7. The resins are prepared by using a formaldehyde/phenol ratio of from 1.0:1.0 to 1.2:1.0, more particularly 1.0:1.0 to 1.1:1.0. Generally, the phenols used to prepare the benzylic ether phenolic resole resins may be represented by the following structural formula:

where B is a hydrogen atom, or hydroxyl radicals, or hydrocarbon radicals or oxyhydrocarbon radicals, or halogen atoms, or combinations of these. Multiple ring phenols such as bisphenol A may be used.

Specific examples of suitable phenols used to prepare the benzylic ether phenolic resole resins include phenol, o-cresol, p-cresol, m-cresol, p-butylphenol, p-amylphenol, p-octylphenol, and p-nonylphenol. Phenols that are unsubstituted in both positions ortho to the phenolic hydroxyl group are preferred in preparing the benzylic ether phenolic resole resins.

The aldehydes reacted with the phenol include any of the aldehydes heretofore used to prepare benzylic ether phenolic resole resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The benzylic ether phenolic resole resins are preferably non-aqueous. By "non-aqueous" is meant a benzylic ether phenolic resole resin which contains water in amounts of no more than about 3%, preferably no more than about 1% based on the weight of the resin.

The benzylic ether phenolic resole resin produced is preferably liquid or soluble in an organic solvent. Solubility in an organic solvent is desirable to achieve uniform distribution of the phenolic resole resin component on the aggregate used in making foundry cores and/or molds. Mixtures of benzylic ether phenolic resole resins can be used.

Modified benzylic ether phenolic resole resins can also be prepared by the process. By modified, it is meant that all or some of the hydroxy methylene groups bonded to the phenolic rings have been converted into alkoxymethylene groups by etherification with aliphatic alcohols. Modified benzylic ether phenolic resole resins are prepared in essentially the same way as the unmodified benzylic ether phenolic resole resins previously described except a lower alkyl alcohol, typically methanol, is reacted with the phenol and aldehyde in situ, or the alcohol is reacted with an unmodified benzylic ether phenolic resole resin made in the presence of pressure. Alcohols which can be used for etherification include methanol, ethanol and butanol, and polyhydric alcohols such as ethylene glycol, propylene glycol and the like. The amount of alcohol added to the charge is typically from 0 to 0.5 moles per mole of phenol, preferably from 0 to 0.3 per moles of phenol.

When used in foundry binders, the benzylic ether phenolic resole resin is usually mixed with at least one organic solvent to form a benzylic ether phenolic resole resin component. Preferably the amount of solvent is from 40 to 60 weight percent of total weight of the benzylic ether phenolic resole resin component. Specific solvents and solvent combinations will be discussed later in conjunction with the solvents used in the polyisocyanate component. The benzylic ether phenolic resole resin component may also contain various optional ingredients such as adhesion promoters, benchlife extenders, and release agents.

The benzylic ether phenolic resole resin component is used in conjunction with a separate organic polyisocyanate component to form the binder. The organic polyisocyanate component typically is a polyisocyanate having a functionality of two or more, preferably 2 to 5. It may be aliphatic, cycloaliphatic, aromatic, or a hybrid polyisocyanate. Mixtures of such polyisocyanates may be used. In some situations, it may be possible to use prepolymers and quasiprepolymers of polyisocyanates. These are formed by reacting excess polyisocyanate with compounds having two or more active hydrogen atoms, as determined by the Zerewitinoff method. Optional ingredients such as benchlife extenders may also be used in the organic polyisocyanate component in the cold-box process for making foundry cores and/or molds.

Representative examples of polyisocyariates which can be used are aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethane diisocyanate, and dimethyl derivatives thereof. Other examples of suitable polyisocyanates are 1,5-naphthalene diisocyanate, triphenylmethane triisocyanate, xylylene diisocyanate, and the methyl derivates thereof, polymethylenepolyphenyl isocyanates, chlorophenylene-2,4-diisocyanate, and the like.

The polyisocyanates are used in sufficient concentrations to allow the curing of the benzylic ether phenolic resole resin by the cold-box process when gassed with an amine curing catalyst, or by the no-bake process by mixing a liquid amine curing catalyst with the sand and binder and allowing it to cure in a mold and/or corebox. In general the isocyanate ratio of the polyisocyanate to the hydroxyl of the benzylic ether phenolic resole resin is from 0.75:1.25 to 1.25:0.75, preferably about 0.9:1.1 to 1.1:0.9.

The polyisocyanate is used in a liquid form. Solid or viscous polyisocyanates must be used in the form of organic solvent solutions, the solvent generally being present in a range of up to 80 percent by weight of the solution.

Those skilled in the art will know how to select specific solvents for the benzylic ether phenolic resole resin component and organic polyisocyanate hardener component. The organic solvents which are used with the benzylic ether phenolic resole resin in the benzylic ether phenolic resole resin component are aromatic solvents, esters, ethers, and alcohols, preferably mixtures of these solvents.

It is known that the difference in the polarity between the polyisocyanate and the benzylic ether phenolic resole resins restricts the choice of solvents in which both components are compatible. Such compatibility is necessary to achieve complete reaction and curing of the binder compositions of the present invention. Polar solvents of either the protic or aprotic type are good solvents for the benzylic ether phenolic resole resin, but have limited compatibility with the polyisocyanate.

The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosolve, butyl Carbitol, diacetone alcohol, and Texanol. Other polar solvents include liquid dialkyl esters such as dialkyl phthalate of the type disclosed in U.S. Pat. No. 3,905,934 and other dialkyl esters such as dimethyl glutarate.

Aromatic solvents, although compatible with the polyisocyanate, are less compatible with the phenolic resole resins. It is, therefore, preferred to employ combinations of solvents and particularly combinations of aromatic and polar solvents. Typical aromatic solvents are toluene, xylene, ethylbenzene, and mixtures thereof. Preferred aromatic solvents are mixed solvents that have an aromatic content of at least 90% and a boiling point range of 138° C. to 232° C.

Drying oils, for example those disclosed in U.S. Pat. No. 4,268,425, may also be used in the polyisocyanate component. Drying oils may be synthetic or naturally occurring and include glycerides of fatty acids which contain two or more double bonds whereby oxygen on exposure to air can be absorbed to give peroxides which catalyze the polymerization of the unsaturated portions.

The binder system is preferably made available as a two-package system with the benzylic ether phenolic resole resin component in one package and the polyisocyanate component in the other package. Usually, the binder components are combined and then mixed with sand or a similar aggregate to form the foundry mix or the mix can be formed by sequentially mixing the components with the aggregate. In the cold-box process, the benzylic ether phenolic resole resin component is first mixed with the sand before mixing the polyisocyanate component with the sand. After mixing both components with the sand, the foundry mix is shaped by blowing it into a corebox where it is contacted with a gaseous tertiary amine. When the no-bake process is used, the benzylic ether phenolic resole resin component is mixed with a liquid tertiary amine curing catalyst and then mixed with the sand. The polyisocyanate component is then mixed with the sand mix which is shaped and allowed to cure in a mold or corebox. The mix can, optionally, contain other ingredients such as benchlife extenders, iron oxide, ground flax fibers, wood cereals, pitch, refractory flours, and the like.

Various types of aggregate and amounts of binder are used to prepare foundry mixes by methods well known in the art. Ordinary shapes, shapes for precision casting, and refractory shapes can be prepared by using the binder systems and proper aggregate. The amount of binder and the type of aggregate used is known to those skilled in the art. The preferred aggregate employed for preparing foundry mixes is sand wherein at least about 70 weight percent, and preferably at least about 85 weight percent, of the sand is silica. Other suitable aggregate materials for ordinary foundry shapes include zircon, olivine, aluminosilicate, sand, chromite sand, and the like.

In ordinary sand type foundry applications, the amount of binder is generally no greater than about 10% by weight and frequently within the range of about 0.5% to about 7% by weight based upon the weight of the aggregate. Most often, the binder content for ordinary sand foundry shapes ranges from about 0.6% to about 5% by weight based upon the weight of the aggregate in ordinary sand-type foundry shapes.

Although the aggregate employed is preferably dry, small amounts of moisture, generally up to about 1 weight percent based on the weight of the sand, can be tolerated. This is particularly true if the solvent employed is non-water-miscible or if an excess of the polyisocyanate necessary for curing is employed since such excess polyisocyanate will react with the water.

In the cold-box process, the foundry mix is molded into the desired shape and cured by passing a tertiary amine through the molded mix such as described in U.S. Pat. No. 3,409,579 which is hereby incorporated into this disclosure by reference. In the no-bake process, a liquid amine curing catalyst is mixed with the benzylic ether phenolic resole resin. This mixture is then applied to the aggregate which is then mixed with the polyisocyanate component. The, total mixture is then placed in a mold where it is allowed to cure.

Another additive which can be added to the binder composition, usually the benzylic ether phenolic resole resin component, in order to improve humidity resistance is a silane such as those described U.S. Pat. No. 4,540,724 which is hereby incorporated into this disclosure by reference.

ABBREVIATIONS AND DEFINITIONS USED IN THE EXAMPLES

| | |
|---|---|
| Conventional Resin | a benzylic ether phenolic resole resin, whether modified or unmodified made in an open reaction vessel without pressure and used for comparison purposes. |
| Distillate | water containing unreacted starting materials including organic compounds such as formaldehyde, phenol, and methanol. |
| Endpoint | used for determining when the reaction to produce the benzylic ether phenolic resin is complete, typically 0.2% free formaldehyde as determined by the sodium sulfite test. |
| Modified resin | a benzylic ether phenolic resole resin, whether made with or without pressure, which is modified with an alcohol such as methanol. |
| MRS-5 | a polymeric organic polyisocyanate sold by Bayer AG. |
| Open reaction vessel | a reactor open to the air and which does not allow pressure to accumulate. |
| Resin Under Pressure | a benzylic ether phenolic resole resin made in a sealed reaction vessel where pressure is generated by applying heat to the reactants. |
| Sealed reaction vessel | reaction vessel closed to the atmosphere which will accumulate pressure when the reactants are heated. |
| Unmodified Resin | a benzylic ether phenolic resole resin, whether made in an open or closed reaction vessel with or without pressure, made without the addition of an alcohol. |
| $M_W$ | is the weight average molecular weight as determined by gel permeation chromatography (GPC) using a column packed with divinyl benzene and a polystyrene calibration curve. |
| Yield | a percentage calculated by dividing the weight of the product that comes out of the reactor by the weight of the feed which goes into the reactor and then multiplying by 100. |

EXAMPLE 1 AND COMPARISON EXAMPLE A

Comparison of an Unmodified Benzylic Ether Resole Resin Made in an Open Reaction Vessel in the Absence of Pressure to One Made in a Sealed Vessel in the Presence of Pressure Example 1 illustrates the preparation of an unmodified benzylic ether phenolic resole resin (RESIN 1) within the scope of this invention. RESIN 1 was made in a sealed reaction vessel. Heat was applied to the reaction vessel to generate pressure in the reaction vessel. The water formed by the reaction was not removed from the reaction vessel until the endpoint for the resin was reached.

A commercially known and accepted resin (RESIN A) used in cold-box binders, was used for comparison purposes. The comparison resin (RESIN A) is a conventional, unmodified benzylic ether phenolic resole resin prepared along the lines as the process described in U.S. Pat. No. 3,409,579. The resin was prepared in an open reaction vessel where pressure could not accumulate. Water formed by the reaction was removed on a continuous basis during part of the reaction. Table I describe the reaction conditions and structural properties of RESIN A. Note that the benzylic ether to methylene bridge ratio for RESIN A was 1.18:1.0.

The weight average molecular weights ($M_W$) of RESIN 1 and RESIN A were about the same. The weight average molecular weight for RESIN 1 was about 1000 while the weight average molecular weight for RESIN A was about 991.

In order to prepare RESIN 1, the reactants were charged to a sealable reactor, capable of maintaining the pressure produced by the reaction, in the amounts set forth in Table I. The reactor was then sealed and the stirred reaction mixture was heated from 43° C. to 113° C. in 70 minutes. After holding the temperature at 113° C. for 60 minutes, the temperature was raised to 125° C. in 75 minutes at which it was held until the free formaldehyde concentration by the sodium sulfite test reached 0.07%.

During the course of the reaction, the pressure had gradually increased to the maximum pressure stated in Table I. No water formed by the reaction was removed up to this point. The pressure was then released while the temperature was allowed to fall. The vapors were passed through a condenser and collected in a receiver. When the pressure had reached 0 psig and the reaction temperature was at 100° C., a vacuum was applied. While holding the temperature at 100° C., water was vacuum distilled until the pressure had fallen to 100 mm. Hg. After 5 minutes at 100° C. and 100 mm. Hg, the vacuum was released, heating was stopped, and the resin yield was determined.

Although the weight average molecular weights of RESIN 1 and RESIN A were almost the same, the benefits of preparing the unmodified benzylic ether phenolic resole resin in a sealed reaction vessel, in the presence of the pressure accumulated by the reaction, are apparent as the data in Table I indicate. In the process using a sealed reaction vessel, the amount of distillate was decreased, the resin yield increased, and the cycle time (CT) was reduced. More particularly, the resin yield was 88.93% (2.01% higher than the conventional process carried out in an open reaction vessel) and the reaction cycle time was 309 minutes (29 minutes shorter than in the conventional process). Also significant is the amount of unreacted starting materials produced by this process which was 15.5 weight percent compared to 30.6 weight percent produced by the conventional process. These results and other results are set forth in Table I.

The physical and structural properties of the unmodified benzylic ether phenolic resole resin made with pressure and the unmodified benzylic ether phenolic resole resin made without pressure were also determined. Table II sets forth the structural properties. The bolded items are the most significant. Particularly note the benzylic ether/methylene bridge ratio for the unmodified benzylic ether phenolic resole resin made in the presence of pressure which is 0.66, while the benzylic ether/methylene bridge ratio for the unmodified benzylic ether phenolic resole resin made without pressure is 1.18. Also note the ortho/para substitution for the unmodified benzylic ether phenolic resole resin, made in the presence of pressure, which is 5.71, while the ortho/para substitution for the unmodified benzylic ether phenolic resole resin made in the absence of pressure is 7.40.

It was surprising that these unmodified benzylic ether phenolic resole resins with a benzylic ether/methylene bridge ratio less than 1.0 could be successfully used to make cores with acceptable properties in view of the prior art teachings which suggest that a benzylic ether/methylene bridge ratio greater than 1.0 is highly preferred.

of RESIN A and the other components listed under Part I of Table III. The organic polyisocyanate component contained about 75 parts of MRS-5 as the organic polyisocyanate and the other components listed under Part II (X) of Table III. A similar resin component was formulated using RESIN 1 which was used with a similar organic polyisocyanate component described as Part II (Y). The formulations and results are summarized in Table III. The data indicate that the cores made with RESIN 1 are comparable to those made with RESIN A even though the benzylic ether/methylene bridge ratio for RESIN 1 was only 0.66. The benzylic ether/methylene bridge ratio for RESIN A was 1.18:1.0 which

TABLE I

COMPARISON OF UNMODIFIED RESINS PROCESSED UNDER PRESSURE WITH RESINS PREPARED WITHOUT PRESSURE

| | Charge | | | | | | Resin Properties | | | Distillate Properties | | | |
|---|---|---|---|---|---|---|---|---|---|---|---|---|---|
| Ex. | F/P | MeOH % | Zn cat. % | Max. °C. | Max Psig | CT Min | Yield % | $M_W$ | Visc. Poise @ 100° C. | Yield % | FF % | Phenol % | MeOH % | Total Organics % |
| Control A | 1.20 | 0 | 0.06 | 125 | 0 | 330 | 86.92 | 991 | 1.05 | 12.36 | 17.6 | 12.1 | 0.9 | 30.6 |
| 1 | 1.01 | 0 | 0.06 | 125 | 19 | 309 | 88.93 | 1000 | 1.10 | 11.25 | 2.1 | 12.9 | 0.5 | 15.5 |

TABLE II

C13 NMR STRUCTURAL PROPERTIES FOR RESIN 1 AND RESIN A

| Ex. | Ar—CH$_2$—Ar | Ar—CH$_2$OC—H$_2$—Ar | Ar—CH$_2$—OH | Ar—CH$_2$O—CH$_3$ | Ar—CH$_2$—OX$^2$ | Ar—CH$_2$OCH$_2$—Ar per ArCH$_2$Ar | o/p subt. |
|---|---|---|---|---|---|---|---|
| Control A | 0.202 | 0.478 | 0.180 | 0 | 0.215 | 1.18 | 7.40 |
| 1 | 0.295 | 0.390 | 0.171 | 0 | 0.106 | 0.66 | 5.71 |

$^2$X = (CH$_2$O)$_n$ or Ar.

Dogbone shaped sand cores were made with Resin A. The resin component of the binder contained 55 parts by weight of RESIN A and the other components listed under Part I of Table III. corresponds to the preferred benzylic ether/methylene bridge ratio shown to be preferred by the prior art.

TABLE III

SAND TEST COMPARISONS USING RESIN 1 MADE AT NCO/OH = 0.95

CONDITIONS

| Sand: | 4000 g. Manley 1I-5W |
|---|---|
| CT$^3$ Room: | 50% Relative Humidity, 25° C. |
| Sand Lab: | 33% Relative Humidity, 22° C. |
| Binder: | 1.3% Based on sand, Part I/Part II = 55/45 |

BINDER FORMULATION

| PART 1 | | Part II | X | Y |
|---|---|---|---|---|
| Resin A or 1 | 55.00 | MRS-5$^4$ | 74.60 | 80.00 |
| DBE$^5$ | 25.00 | HI SOL-10 | 9.30 | 7.30 |
| DOA$^6$ | 12.00 | KEX$^7$ | 5.36 | 4.20 |
| HI SOL-10 | 5.00 | PLO$^8$ | 5.64 | 4.42 |
| EMEREST 2380 | 1.00 | DIBP$^9$ | 4.70 | 3.68 |

TABLE III-continued

SAND TEST COMPARISONS USING RESIN 1 MADE AT NCO/OH = 0.95

| SYLFAT 95 | 0.80 | | BPOD[10] | | 0.40 | | 0.40 | |
|---|---|---|---|---|---|---|---|---|
| Silane | 0.40 | | | | | | | |

| | | | TENSILE PROPERTIES, PSI | | | | | |
|---|---|---|---|---|---|---|---|---|
| | | | ZERO BENCH | | | | HR. BENCH | |
| EXAMPLE | PART I | PART II | IMM | 5 MIN | 1 HR. | 24 HR. | 100% RH | IMM | 24 HR. |
| CONTROL B | RESIN A | X | 128 | 155 | 165 | 182 | 33 | 99 | 164 |
| 2 | RESIN 1 | Y | 129 | 162 | 168 | 203 | 39 | 98 | 161 |

Castings were produced using cores made from binders containing RESIN 1 and Resin A. Grey iron castings were poured at about 1,500° C. around 2" × 2" cylindrical cores made with binders using RESIN 1 and RESIN A. The binders used were the same binders used in Example 2 and Control B. The amount of binder used to make the cores was 1.3% based on the sand.
[3]CT = constant temperature/humidity room, used to store cores that were tested after 5 minutes.
[4]organic polyisocyanate.
[5]dibasic ester.
[6]dioctyl adipate.
[7]kerosene.
[8]polymerized linseed oil as 50% solution in HI SOL-15.
[9]diisobutyl phthalate.
[10]benzenephosphorus oxydichloride.

The castings were evaluated with respect to penetration resistance, veining, and surface finish by the Penetration Casting 2"×2" Test Casting based upon a modification of a design used by Murton and Gertsman for the investigation of metal penetration. The test is used extensively not only to evaluate penetration resistance, but veining and surface finish. After the metal is poured and cooled, the casting is observed and graded with respect to penetration resistance, veining, and surface finish.

The casting results are shown in Table IV. Table IV indicates that the castings, made with cores using the unmodified resins synthesized in a sealed reaction vessel under pressure showed less penetration. See column in the table related to penetration. Metal penetration occurs when metal or metal oxides fill the voids between the sand grains of the core without displacing them or chemically changing the silica or binder. When there is penetration in a casting, the casting will require repair or be discarded as scrap. This increases cost and decreases efficiency in the foundry.

TABLE IV

CASTING TESTS MADE USING A CONVENTIONAL RESIN AND A BENZYLIC ETHER PHENOLIC RESOLE RESIN MADE UNDER PRESSURE

| EXAM-PLE | BINDER | PENE-TRATION | VEINING | SURFACE FINISH |
|---|---|---|---|---|
| C | CONTROL B/RESIN A | 3.5 | 3 | 3 |
| 3 | EXAMPLE 2/RESIN 1 | 1.5 | 3 | 4 |

Casting Grade: 1 = Excellent, 2 = Good, 3 = Fair, 4 = Poor, 5 = Very Poor

EXAMPLES 4–5

Modified Resins Made at Varying Pressure

In Examples 4–5, modified benzylic ether phenolic resole resins (modified with methanol) were prepared in a sealed reaction vessel such that the pressure generated by the reaction varied from 20 psig to 40 psig. The procedure followed for preparing the modified benzylic ether phenolic resole resins was essentially the same as that followed in Example 1 except methanol was added to the charge, and the final temperature at which the reaction mixture was held until the free formaldehyde end point was reached is shown in Table V (Max. ° C.). Table V which follows shows the results of generating higher pressures in the sealed reactor. Note that the cycle time decreased from 405 minutes to 271 minutes and the yield of resin per unit of time increased when pressure generated in the sealed reaction vessel increased from 20 psig to 40 psig. These results and other results are set forth in Table V.

The physical and structural properties of the benzylic ether phenolic resole resins modified with methanol were also determined. Table VI sets forth the structural properties for the resins made in accordance with Examples 4–5. Note that the benzylic ether/methylene bridge ratio (in bold print) was about the same, namely 0.62 in Example 4 and 0.65 for Example 5. Moreover, the benzylic ether/methylene bridge ratio of resins, made when pressure was generated in the reaction vessel, is evidently not substantially influenced by methanol modification since RESIN 1, described in Example 1 as an unmodified benzylic ether phenolic resole resin made in a sealed reaction vessel, had a dimethylene ether/methylene bridge ratio bridge ratio of 0.66.

TABLE V

EFFECTS OF INCREASED PRESSURE IN THE PREPARATION OF MODIFIED RESINS

| | Charge | | | | | | Resin Properties | | | Distillate Properties | | | |
|---|---|---|---|---|---|---|---|---|---|---|---|---|---|
| Ex. | F/P | MeOH % | Zn cat. % | Max. °C. | Max Psig | CT Min | Yield % | $M_W$ | Visc. Poise @ 100° C. | Yield % | FF % | Phenol % | MeOH % | Total Organics % |
| 4 | 1.1:1.0 | 2.00 | 0.06 | 125 | 20 | 405 | 87.7 | 1190 | 2.5 | 11.8 | 2.6 | 5.9 | 5.7 | 14.2 |
| 5 | 1.1:1.0 | 2.00 | 0.06 | 135 | 40 | 271 | 87.6 | 1210 | 2.0 | 11.8 | 2.8 | 6.7 | 4.8 | 14.3 |

TABLE VI

C13 NMR STRUCTURAL ANALYSES OF MODIFIED RESINS PREPARED WITH INCREASING PRESSURE

| Ex. | Ar—$CH_2$—Ar | Ar—$CH_2OC$—$H_2$—Ar | Ar—$CH_2$—OH | Ar—$CH_2O$—$CH_3$ | Ar—$CH_2$—$OX^{11}$ | Ar—$CH_2OCH_2$—Ar per $ArCH_2Ar$ | o/p subt. |
|---|---|---|---|---|---|---|---|
| 4 | 0.338 | 0.420 | 0.146 | 0.049 | 0.106 | 0.62 | 4.94 |
| 5 | 0.296 | 0.384 | 0.156 | 0.052 | 0.115 | 0.65 | 4.92 |

$^{11}X = (CH_2O)_n$ or Ar.

EXAMPLES 6–7

Effect of Phenol to Formaldehyde Ratio

Examples 6–7 illustrate the effect of the formaldehyde/phenol ratio on 1-butanol modified benzylic ether phenolic resole resins prepared in a sealed reaction vessel where the pressure in the reaction vessel is essentially the same, i.e. about 25 psig. The formaldehyde to phenol ratios used were 1.1:1.0 and 1.2:1.0.

The procedure for preparing the modified benzylic ether phenolic resole resins was essentially the same as that followed in Example 4-5 except 1-butanol was used as the modifier. The charges of the reactants are specified in Table VII. Table VIII sets forth the structural properties of the modified benzylic ether phenolic resole resins.

The results in Table VII indicate that yield increases per unit of time and cycle time decreases at lower formaldehyde to phenol ratios. Table VIII indicates that the ether to methylene bridge ratio for these resins modified with 1-butanol is higher than the unmodified resins and those modified with methanol, but the ratios are still <1.

TABLE VII

EFFECT OF THE FORMALDEHYDE/PHENOL RATIO ON RESINS MADE IN SEALED REACTORS

| | Charge | | | | | | | Resin Properties | | | | Distillate Properties | | | | Total |
|---|---|---|---|---|---|---|---|---|---|---|---|---|---|---|---|---|
| Ex. | F/P | BuOH % | Zn Cat. % | Max. Temp. °C. | Mx. Press. Psig | End Point % FF | Cycle Time Min. | Yield % | $M_W$ | Visc. @ 100° C. Poise | Free Form. % | Yield | Free Form. % | Phenol % | BuOH % | Organics % |
| 6 | 1.10 | 13.9 | 0.10 | 130 | 34 | 0 | 331 | 86.9 | 605 | 0.1 | 0 | 12.87 | 1.6 | 4.9 | 25.0 | 31.5 |
| 7 | 1.20 | 18.3 | 0.10 | 130 | 36 | 0.09 | 371 | 84.3 | 863 | 0.2 | 0 | 15.36 | 2.4 | 5.4 | 27.3 | 35.1 |

TABLE VIII

C13 NMR STRUCTURAL PROPERTIES OF MODIFIED RESINS PREPARED WITH VARYING FORMALDEHYDE/PHENOL RATIOS

| Example | Ar—CH$_2$—Ar | Ar—CH$_2$OC—H$_2$—Ar | Ar—CH$_2$—OH | Ar—CH$_2$O—C$_4$H$_9$ | Ar—CH$_2$— OX[12] | Ar—CH$_2$OCH$_2$—Ar per ArCH$_2$Ar | o/p subt. |
|---|---|---|---|---|---|---|---|
| 6 | 0.223 | 0.377 | 0.172 | 0.172 | 0.113 | 0.85 | 7.87 |
| 7 | 0.210 | 0.354 | 0.150 | 0.259 | 0.092 | 0.84 | 8.49 |

[12]X = (CH$_2$O)$_n$ or Ar.

We claim:

1. A polyurethane-forming binder system curable with a catalytic amount of a tertiary amine catalyst comprising as separate components:

(a) a benzylic ether phenolic resole resin component which comprises a benzylic ether phenolic resole resin, prepared in a sealed reaction vessel wherein said reaction vessel is heated to generate an internal pressure in said reaction vessel, where said benzylic ether phenolic resole resin comprises a mixture of components (I) and (II) represented by the following structural formulae:

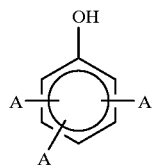

(I)

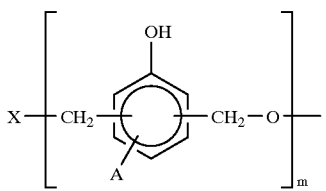

(II)

where

A = —H, —CH$_2$OH, or a C$_1$ to C$_{20}$ hydrocarbon radical;

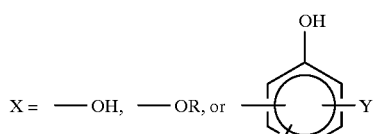

(III)

Y = H, —CH$_2$OH, or —CH$_2$OR;

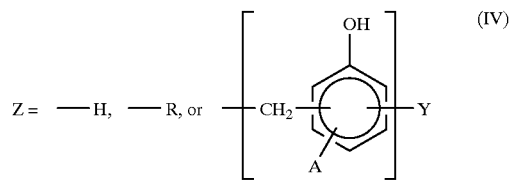

(IV)

R = a C$_1$ to C$_{20}$ hydrocarbon radical;

m, n and p = 0,1 or greater than 1;

w = 1 or greater than 1;

the sum of w and p is at least 2, and such that the benzylic ether to methylene bridge ratio for the mixture of (I) and (II), as determined by C13 NMR spectroscopy is from 0.3:1.0 to 0.9:1.0, and (b) a polyisocyanate component.

2. The binder system of claim 1 wherein said benzylic ether phenolic resole resin contains less than 0.25% free formaldehyde.

3. The binder system of claim 2 wherein said resin is characterized by the following:

(1) a benzylic ether to methylene bridge ratio, as determined by C13 NMR spectroscopy of from 0.3:1.0 to 0.9:1.0;

(2) a total ortho to para substitution ratio of 3:1.0 to 10:1.0;

(3) a weight average molecular weight (M$_W$) of 700 to 2,000; and (4) a viscosity of 0.5 centipoise to 5.0 centipoise at 100° C.

4. The binder system of claim 3 wherein said resin is such that the weight ratio of structure I to structure II is from 0:100 to 67:100.

5. The binder system of claim 4 wherein the resin is characterized by the following:

(1) a benzylic ether to methylene bridge ratio, as determined by C13 NMR spectroscopy of from 0.4:1.0 to 0.75:1.0;

(2) a total ortho to para substitution ratio of 3:1.0 to 10:1.0;

(3) a weight average molecular weight (M$_W$) of 900 to 1,400; and (4) a viscosity of 0.7 centipoise to 2.0 centipoise at 100° C.

6. The binder system of claim 5 wherein the resin component contains a solvent in which the benzylic ether phenolic resole resin is soluble, and wherein the polyisocyanate component contains a solvent in which the polyisocyanate is soluble.

7. The binder system of claim 6 wherein the ratio of hydroxyl groups of the benzylic ether phenolic resin to the isocyanate groups of the polyisocyanate hardener is from 0.9:1.1 to 1.1:0.9.

8. A foundry mix comprising:

(a) a major amount of an aggregate; and (b) the binder system of claim 1, 2, 3, 4, 5, 6, or 7 in the amount of about 0.5 to 10.0 weight percent based upon the weight of the aggregate.

9. The foundry mix of claim 8 which also contains a liquid tertiary amine curing catalyst.

* * * * *